J. & C. J. BAMFORD.
SIDE DELIVERY HAY RAKING MACHINE.
APPLICATION FILED JULY 29, 1916.

1,224,876.

Patented May 1, 1917.
4 SHEETS—SHEET 1.

Inventors
Joseph Bamford
Cyril Joseph Bamford

Attorney

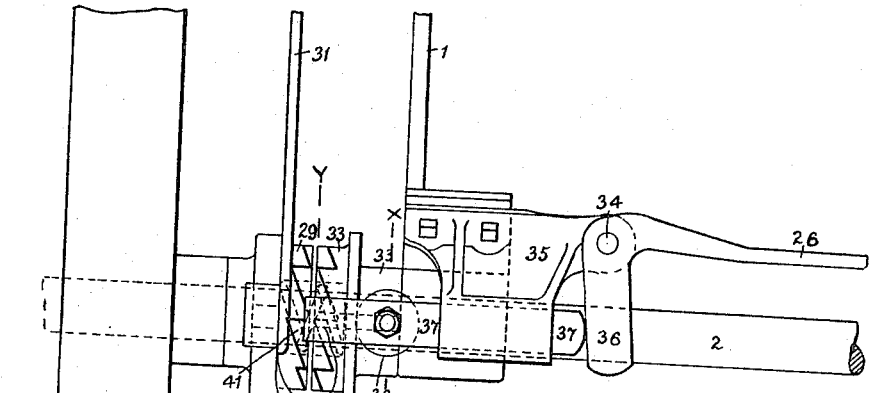

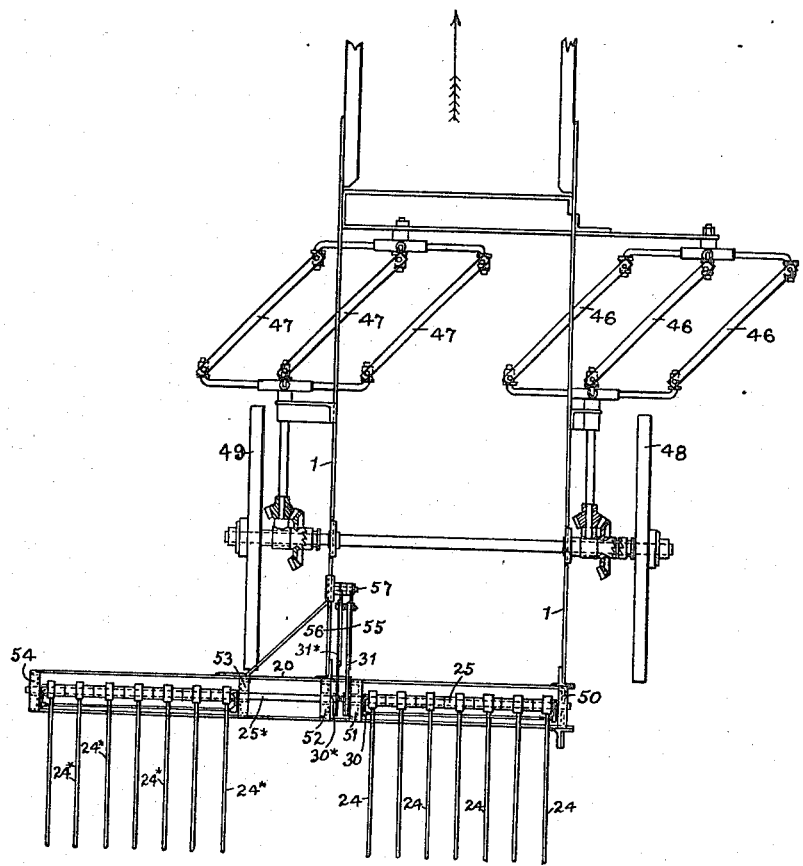

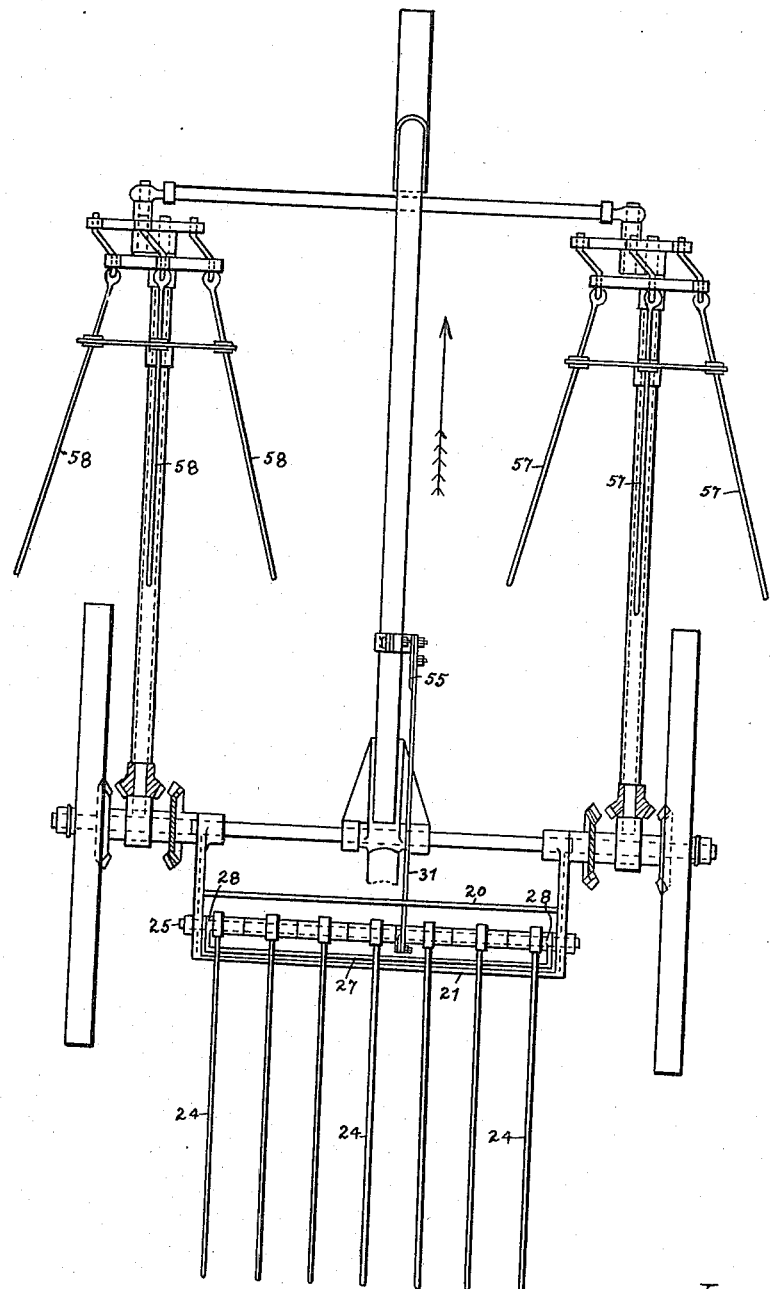

UNITED STATES PATENT OFFICE.

JOSEPH BAMFORD AND CYRIL JOSEPH BAMFORD, OF ST. MARY'S MOUNT, UTTOXETER, ENGLAND.

SIDE-DELIVERY HAY-RAKING MACHINE.

1,224,876.        Specification of Letters Patent.        Patented May 1, 1917.

Application filed July 29, 1916.    Serial No. 112,145.

*To all whom it may concern:*

Be it known that we, JOSEPH BAMFORD and CYRIL JOSEPH BAMFORD, both residing at St. Mary's Mount, Uttoxeter, in the county of Stafford, England, subjects of His Majesty the King of Great Britain and Ireland, have invented certain new and useful Improvements in and Connected with Side-Delivery Hay-Raking Machines, of which the following is a specification.

This invention has reference to side delivery hay raking machines and is directed to provide simple and efficient means forming part of such machines whereby the hay will be gathered and formed into cocks as it is delivered at the side of the machine by the revolving rakes.

According to our invention a side delivery hay raking machine of any desired type is at the delivery side of the rakes furnished with a hay gathering and cocking device adapted to gather the hay on the ground without raising the hay off the ground, said device being large enough to hold sufficient hay to form one cock and being preferably situated just behind the revolving rakes so as to gather the hay on the ground as it is delivered and to move the hay along the ground and when said device has gathered sufficient hay to form one cock the gatherer lifts or is lifted or otherwise operated away from the gathered hay which is thus left on the ground in the form of a cock and then to continue to gather the hay on the ground as before to form the next cock and so on and thus the labor of forming the hay into cocks by hand is saved.

Our invention can be carried into practice in various ways some of which by way of examples we will now describe by referring to the accompanying drawings but it is to be understood that our invention is not limited to these particular arrangements.

Fig. 3 is a back elevation of a portion of the same machine drawn on a larger scale than are Figs. 1 and 2 and illustrating the clutch mechanism for operating the lifting gear of the tines when sufficient hay has been gathered by them to form one cock;

Fig. 4 is a plan of a portion of said mechanism;

Fig. 5 is a cross sectional end elevation of the same taken on line X X of Fig. 3;

Fig. 6 is a cross sectional end elevation of the same taken on line Y Y of Fig. 3 and looking toward the left hand side of that figure;

Figure 1:
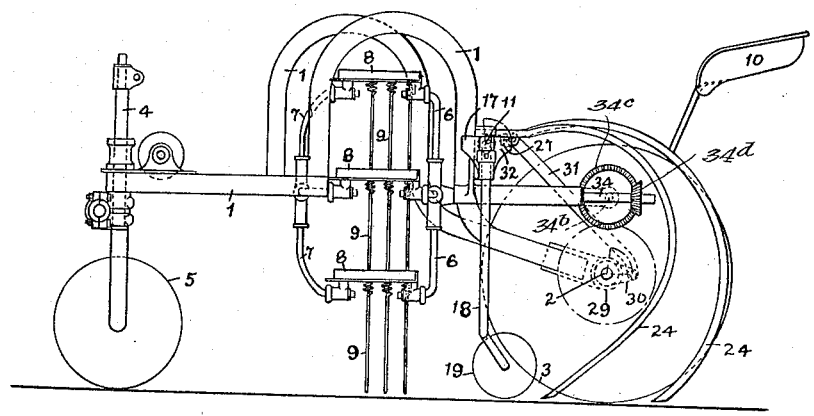
Figure 1 is a side elevation of a known type of side delivery hay raking machine with our present invention applied thereto.

Fig. 7 is a plan partly in section of another type of side delivery hay raking machine with our invention applied thereto, this machine being of the well known kind which has two sets of revolving rake bars arranged side by side and adapted to rake the hay so as to form two swaths at the sides of the revolving rake bars, or to be used for swath turning, and Fig. 8 is a plan of a hay raking machine of the kind described in our prior British Patent No. 24,001/06 and furnished with two sets of revolving rake tines, each set by means of the reversing gear being adapted to deliver the hay into the center of the machine.

We will first describe the arrangement of our invention illustrated by Figs. 1 to 6 applied to a side delivery hay rake of a well known type. In this machine 1 is the framework carried at the back end by the axle 2 of the road wheels 3 and at the front end by the swivel spindle 4 and front wheel 5, the machine being arranged to travel in the direction indicated by the arrow in Fig. 2. 6 and 7 are the two revolving reels or spiders carrying the rake bars 8 furnished with continuously depending tines 9 and arranged to deliver the crop at the left hand side of the machine as it is traveling in the direction indicated by the arrow in Fig. 2. As illustrated the reel spindle 34 receives its rotary motion from the road wheel axle 2 through toothed gearing arranged outside the road wheel 3, there being a gear 34' on the axle 2 which meshes with a gear $34^a$ on a short shaft $34^b$ on which is a beveled gear $34^c$ with which latter gear meshes a beveled gear $34^d$ on the reel spindle 34, all as shown particularly in Figs. 1 and 2. 10 is the driver's seat. All these parts of the machine are well known and form no part of our present invention.

In this arrangement of our invention illustrated by Figs. 1 to 6 the hay gatherer comprises a horizontal shaft preferably made in two parts marked respectively 11, 12 and connected together by a universal joint 13 so that the part 12 can rise and fall about the joint 13 to some extent according to the inequalities of the ground over which the machine is traveling. The part 11 of said horizontal shaft is mounted to rock in two bearing brackets marked respectively 14, 14* of which the bracket 14 is fixed to one of the side bars of the machine frame and the bracket 14* is fixed to the prolongation 15 of the cross bar 16 of the frame. The outer end of the part 12 of the shaft is mounted in an end bracket 17 which is carried by the upright stem 18 which at its lower end carries the traveling wheel 19 which runs along the ground and thus supports the outer end 17 of the shaft 12 at the proper height. 20 and 21 are two horizontal side bars arranged at the sides of the shaft 12 and which are bolted to the sides of the bracket 17 and at their other ends are jointed at 22 to the two continuation pieces 20*, 21* which are connected to the bracket 14* by the pin 44. The side bars 20, 21 are also tied together by the cross bar 23. The shaft 12 carries a suitable number say for instance six rearwardly and downwardly curved lines 24 like those of a horse rake made with long bearings 25 mounted loosely on the shaft 12, the pointed lower ends of said tines 24 extending to or nearly to the ground line (see Fig. 1). This rocking shaft 11, 12 is adapted to be rocked in its bearings through clutch gear and connections (hereinafter described) and a foot lever 26 situated in a convenient position for the man who is riding on the seat 10 of the machine.

Figure 2:
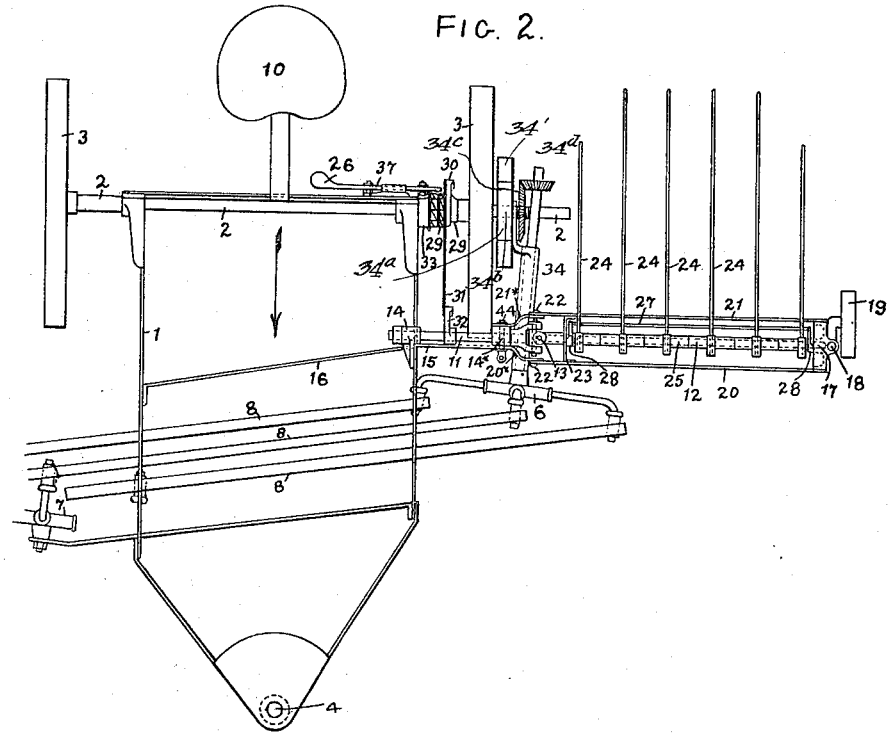
Fig. 2 is a plan of the same.
Figure 2:
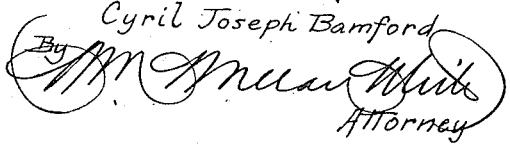

As the machine is drawn along in the direction indicated by the arrow in Fig. 2 and the hay is by the revolving rakes delivered to the left hand side of the driver and the machine the hay is gathered by the long curved tines 24 of the gatherer and when sufficient hay has been so gathered to form one cock the man riding on the saddle 10 of the machine presses the foot lever 26 so that by the clutches and connections to the rocking shaft 11, 12 the latter is turned through an angle of say about 90 degrees and this angular movement is communicated to the tines 24 as hereinafter described thereby raising the tines out of the hay which they have gathered which thus is left behind as a cock and then the tines move down again to continue gathering the hay to form the next cock. The connection of the portion 12 of the shaft to the tines so as to lift them when the shaft is rocked as aforesaid is preferably effected by the horizontal cross bar 27 which is arranged immediately underneath the tines 24 parallel with and near to the shaft 12 and is carried from the said shaft by the two side arms 28 which are fixed to the bar 27 and to the shaft so that the turning movement of the shaft raises the bar 27 which then lifts the tines as aforesaid.

The mechanism for turning the rocking shaft 11 so as to raise the tines 24 high enough to discharge the gathered hay and then immediately to drop again after the hay has been discharged, is preferably arranged to be operated from the revolving road wheel axle 2 as follows:—Mounted to turn loosely on the axle 2 there is a half clutch 29 fixed to the lever arm 30 which by the link 31 is connected to the outer end of the lever 32 which is fixed on the rocking shaft 11. Mounted so as to slide on a feather on the axle 2 there is the other half clutch 33 adapted to engage with the half clutch 29. This half clutch 33 is operated by the two armed foot lever 26 which turns on a fulcrum pin 34 on the bracket 35 which is fixed to one of the cross bars of the frame 1. The shorter arm 36 of the foot lever acts against the end of a sliding bar 37 which is mounted for endwise movement in the boss 38 of the bracket 35 and is furnished with a roller 39 which bears against the flange 40 of the half clutch 33 so that when the foot lever 26 is depressed the half clutch 33 will be put into gear with the other half clutch 29. The half clutches are normally forced apart by means of a coiled wire spring 41 which surround the road wheel axle 2 and is inclosed in concentric recesses in the half clutches 29, 33. When the driver presses his foot on the foot lever 26 for the purpose of turning the rocking shaft 11, 12 to raise the tines 24 out of the hay which has been gathered, the roller 39 of the sliding bar 37 presses against the flange 40 and forces the half clutch 33 into gear with the half clutch 29 and thereby turning the latter and the lever 30 and link 31 and lever 32 and rocking shaft 11, 12 through a certain angle far enough to raise the tines 24 out of the gathered hay. Then when this position of the tines has been reached the sliding bar 37 which has a lump 45 to engage the flange 40 (see Fig. 4) is automatically forced back by means of the inclined portion 42 which is formed on the face of the half clutch 29 and which rides against the end 43 of the sliding bar 37 and forces the same backwardly so as with the spring 41 to force the half clutch 33 out of gear with the half clutch 29 and the tines 24 then fall down again into their operative position.

This mechanism for rocking the shafts 11 to lift the tines 24 and allow them to fall again as above described is merely given as an example in which the raising is done by power, but various other suitable arrangements of mechanism may be employed for the purpose such for instance as a hand power lever or a foot power lever and connections so adapted and arranged that the attendant riding on the saddle 10 can by hand or foot power rock the shaft 11 to raise or lower the tines at the proper times as aforesaid.

When the side delivery hay raking machine is required to be used without our invention then the cocking and gathering device can readily be detached and removed from the side delivery hay rake by first removing the connecting pin 44 and one of the joint pins of the universal joint 13 as will readily be understood.

Our invention can be similarly applied to other types of side delivery hay raking machines such alterations being made as may be necessary to adapt our invention to the particular kind of side delivery hay raking machine with which our invention is used.

When the machine is furnished with two sets of revolving side delivery raking tines it is preferred for the machine to be furnished with two sets of cocking devices one for each set of raking tines and adapted to collect the hay as delivered at the sides of the revolving tines and form the same into cocks as above described. A well known construction of side delivery hay raking and swath turning machine of this type is illustrated in plan by Fig. 7 where the two sets of revolving rake bars with continuously depending tines are marked respectively 46, 47 which are driven through gearing from the corresponding road wheels 48, 49 the machine being arranged to travel in the direction indicated by the arrow, only such parts being shown as are necessary to illustrate our invention. It will be seen that there are two sets of cocking devices marked respectively 24 and 24* the set 24 being adapted to gather the hay which is delivered as a swath at the left hand side of the revolving rake bars 46 and the other set of cocking tines 24* being arranged to gather the hay which is delivered into a swath at the side of the revolving rake bars 47. The rocking shaft 25 on which the tines 24 are loosely mounted is carried in end bearings 50, 51 fixed to the longitudinal side bars 20, 21 which in turn are fixed across the end of the machine frame 1, and similarly the other rocking shaft 25* on which the tines 24* are mounted is carried in end bearings 52, 53, 54 also fixed to the cross bars 20, 21. In this particular example of our invention the rocking of the shafts 25, 25* for the purpose of lifting the tines is effected by two corresponding hand levers 55, 56 which turn on a fulcrum pin 57 fixed to the machine frame in a convenient position for the driver (whose saddle or seat is not shown) these hand levers being respectively connected by the connecting rods 31, 31* which are respectively fixed on the rocking bars 25, and 25* so that by this means the driver can lift one or other of the sets of gathering tines 24, 24* or both of them simultaneously.

When applying our invention to a side delivery hay raking and swath turning machine of another well known kind illustrated in plan by Fig. 8, it is preferred that one set of cocking tines 24 to be employed and arranged behind the road wheel axle at about the center of the machine so as to collect and form into cocks the hay which is raked and delivered at the center of the machine by means of the two sets of revolving tines 57 and 58 which are as heretofore each driven by reversing gear, by which means they can be adapted to rotate in opposite directions to each other both raking the hay from the sides of the machine and delivering it to those sides of the revolving tines which correspond with the center of the machine and the track of the hay cocking device.

What we claim as our invention and desire to secure by Letters Patent is:—

1. The combination with a side delivery hay raking machine, of a hay gathering device secured to the delivery side of the raking machine to gather the hay as the hay is delivered from the raking machine, said hay gathering device including a rock shaft composed of inner and outer sections, a universal joint connection between said shaft sections, means to support said shaft including an upright member to which the outer end of the outer shaft section is connected and a ground wheel journaled on the lower end of said upright, curved tines loosely mounted on the outer shaft section, a rod having fixed connection with the outer shaft section and arranged parallel therewith under the inner ends of the tines, and means for rocking said sectional shaft to force said rod into engagement with the tines to elevate the latter away from the gathered hay when the shaft is rocked so as to leave the hay on the ground in the form of a cock.

2. The combination with a side delivery hay raking machine, of a hay gathering device secured to the delivery side of the raking machine to gather the hay as the same is delivered from the raking machine, said device including a rock shaft, means for supporting said shaft including an upright provided with a wheel at its lower end to support the outer end of the rock shaft, tines pivotally mounted on the rock shaft, means to rock the shaft, and means connected to the shaft for engagement with the tines when the shaft is rocked to elevate the tines away from the hay so as to permit the tines to pass over the gathered hay.

3. The combination with a hay raking machine having revolving tines which revolve across the path of the machine and deliver the hay at the side of the machine, of a hay gathering device secured to the raking machine to gather the hay as the hay is delivered from the raking machine, said hay gathering device including a rock shaft, means to support the shaft including a wheel to support the outer end of said shaft and tines loosely connected to the shaft, means to rock the shaft, and means to elevate the tines when said shaft is rocked.

4. The combination with a hay raking machine having an axle and means to deliver the hay at the side of the machine, of a hay gathering device secured to the raking machine to gather the hay as the hay is delivered from the raking machine, said device including a rock shaft, means to support the shaft and tines loosely mounted on the shaft, a normally inoperative clutch mechanism on said axle, a connection between the clutch mechanism and said rock shaft, means operable to throw said clutch into operative condition to rock said shaft as the machine moves over the ground, and means operable by the rock shaft to elevate said tines on rocking movement of the rock shaft.

5. The combination with a hay raking machine, of a hay gathering device secured to the machine, said device including a rock shaft, means for supporting said shaft, including relatively close parallel bars, tines pivotally mounted on the rock shaft and extending rearwardly over the rear one of said bars, means for rocking said shaft, and means secured to the shaft and located between said bars to engage the tines to elevate the latter when said shaft is rocked.

6. The combination with a hay raking machine, of a hay gathering device secured to the raking machine to gather the hay as the hay is delivered from the raking machine, said hay gathering device including a sectional rock shaft, a universal joint connection between the shaft sections, means to support the shaft sections, tines pivotally mounted on the rock shaft, means to rock the shaft, and means to elevate the tines when said shaft is rocked.

In testimony whereof we affix our signatures in presence of two witnesses.

JOSEPH BAMFORD.
CYRIL JOSEPH BAMFORD.

Witnesses:
 ERNEST HARKER,
 CHARLES BOSWORTH KETLEY.

Copies of this patent may be obtained for five cents each, by addressing the "Commissioner of Patents, Washington, D. C."